United States Patent
Tuffile et al.

(10) Patent No.: US 10,920,295 B2
(45) Date of Patent: *Feb. 16, 2021

(54) 3D PRINTABLE HARD FERROUS METALLIC ALLOYS FOR POWDER BED FUSION

(71) Applicant: The NanoSteel Company, Inc., Providence, RI (US)

(72) Inventors: Charles D. Tuffile, Swansea, MA (US); Harald Lemke, Northport, NY (US)

(73) Assignee: The NanoSteel Company, Inc., Providence, RI (US)

( * ) Notice: Subject to any disclaimer, the term of this patent is extended or adjusted under 35 U.S.C. 154(b) by 241 days.

This patent is subject to a terminal disclaimer.

(21) Appl. No.: 15/800,210

(22) Filed: Nov. 1, 2017

(65) Prior Publication Data

US 2018/0119239 A1 May 3, 2018

Related U.S. Application Data

(60) Provisional application No. 62/415,667, filed on Nov. 1, 2016.

(51) Int. Cl.
*C21D 6/00* (2006.01)
*C23C 8/22* (2006.01)
(Continued)

(52) U.S. Cl.
CPC .......... *C21D 8/0257* (2013.01); *B22F 3/1055* (2013.01); *B23K 26/0006* (2013.01);
(Continued)

(58) Field of Classification Search
None
See application file for complete search history.

(56) References Cited

U.S. PATENT DOCUMENTS

| 2003/0082066 A1 | 5/2003 | Hajaligol et al. |
| 2008/0038144 A1 | 2/2008 | Maziasz et al. |

(Continued)

FOREIGN PATENT DOCUMENTS

| DE | 10039144 | 11/2001 |
| EP | 1992709 | 11/2008 |

(Continued)

OTHER PUBLICATIONS

E.J Mittemeijer, Fundamentals of Nitriding and Nitrocarburizing, ASM Handbook, vol. 4A, Steel Heat Treating Fundamentals and Processes (Year: 2013).*

(Continued)

*Primary Examiner* — Colleen P Dunn
*Assistant Examiner* — Michael J Kachmarik
(74) *Attorney, Agent, or Firm* — Grossman, Tucker, Perreault & Pfleger, PLLC

(57) ABSTRACT

The present invention relates to alloy compositions for 3D metal printing procedures which provide metallic parts with high hardness, tensile strengths, yield strengths, and elongation. The alloys include Fe, Cr and Mo and at least three or more elements selected from C, Ni, Cu, Nb, Si and N. As built parts indicate a tensile strength of at least 1000 MPa, yield strength of at least 640 MPa, elongation of at least 3.0% and hardness (HV) of at least 375.

19 Claims, 9 Drawing Sheets

(51) Int. Cl.
| | |
|---|---|
| *B22F 3/105* | (2006.01) |
| *C22C 38/48* | (2006.01) |
| *C22C 38/42* | (2006.01) |
| *C22C 38/44* | (2006.01) |
| *C22C 38/00* | (2006.01) |
| *C22C 38/02* | (2006.01) |
| *C22C 38/20* | (2006.01) |
| *C22C 38/22* | (2006.01) |
| *C22C 38/26* | (2006.01) |
| *C22C 38/40* | (2006.01) |
| *B22F 3/24* | (2006.01) |
| *C23C 8/54* | (2006.01) |
| *C21D 8/02* | (2006.01) |
| *B23K 26/00* | (2014.01) |
| *B22F 9/08* | (2006.01) |
| *B22F 1/00* | (2006.01) |
| *C22C 33/02* | (2006.01) |

(52) U.S. Cl.
CPC ............ *C21D 6/002* (2013.01); *C21D 6/004* (2013.01); *C22C 38/001* (2013.01); *C22C 38/02* (2013.01); *C22C 38/20* (2013.01); *C22C 38/22* (2013.01); *C22C 38/26* (2013.01); *C22C 38/40* (2013.01); *C22C 38/42* (2013.01); *C22C 38/44* (2013.01); *C22C 38/48* (2013.01); *C23C 8/22* (2013.01); *C23C 8/54* (2013.01); *B22F 1/0011* (2013.01); *B22F 9/082* (2013.01); *B22F 2003/241* (2013.01); *B22F 2003/248* (2013.01); *B22F 2201/02* (2013.01); *B22F 2201/30* (2013.01); *B22F 2998/10* (2013.01); *B22F 2999/00* (2013.01); *C22C 33/0278* (2013.01); *Y02P 10/25* (2015.11)

(56) References Cited

U.S. PATENT DOCUMENTS

| | | | |
|---|---|---|---|
| 2010/0258217 A1* | 10/2010 | Kuehmann | C21D 6/02 148/542 |
| 2013/0065073 A1* | 3/2013 | Fuwa | C22C 33/0285 428/548 |
| 2015/0284817 A1 | 8/2015 | Snyder et al. | |
| 2015/0328680 A1 | 11/2015 | Tuffile et al. | |
| 2016/0221083 A1 | 8/2016 | Tuffile et al. | |
| 2016/0251736 A1* | 9/2016 | Shimizu | C21D 1/18 419/7 |
| 2016/0333450 A1* | 11/2016 | Ikeda | C22C 33/0285 |
| 2017/0182598 A1* | 6/2017 | Crear | B22F 3/1055 |
| 2019/0262944 A1* | 8/2019 | Tuffile | B23K 26/34 |

FOREIGN PATENT DOCUMENTS

| | | | | |
|---|---|---|---|---|
| WO | WO2015137507 | | 9/2015 | |
| WO | WO-2015137507 A1 * | | 9/2015 | ......... C22C 33/0285 |

OTHER PUBLICATIONS

C.A. Stickler, Carburizing, ASM Handbook, vol. 18: Friction, Lubrication, and Wear Technology (Year: 1992).*
T. Ujiro, Effect of alloying Cu on the corrosion resistance of stainless steel in chloride media, corrosion science (Year: 2001).*
Sarkar, Effect of mean stresses on mode of failures and fatigue life of selective laser melted stainless steel, Materials Science & Engineering A, 2017 (Year: 2017).*
AK 15-5 PH stainless steel product data bulletin (Year: 2017).*
Sudha Cheruvathur, Additive Manufacturing of 17-4 PH Stainless Steel: Post-processing Heat Treatment to Achieve Uniform Reproducible Microstructure, the Minerals, Metals & Materials Society, 2015 (Year: 2015).*
Coffy, Microstructure and Chemistry Evaluation of Direct Metal Laser Sintered 15-5 PH Stainless Steels, 2014 (Year: 2014).*
Sarkar, Effect of Different Heat Treatments on Mechanical Properties of Laser Sintered Additive Manufactured Parts, Journal of Manufacturing and Science Engineering, Nov. 2017 (Year: 2017).*
Karaminezhaad, Effect of molybdenum on SCC of 17-4PH stainless steel under different aging conditions in chloride solutions, J Mater Sci, 2006 (Year: 2006).*
International Search Report dated Jan. 25, 2018 issued in related International Patent Application No. PCT/US2017/059449.
Capudean "Metallurgy Matters: Carbon Content, Steel Classifications, and Alloy Steels" Aug. 28, 2003 (Aug. 28, 2003). p. 1 para[0001]. Retrieved from https://www.thefabricator.com/article/metalsmaterials/carbon-content-steel-classifications-and-alloy-steels on Jan. 4, 2018 904.01.20180.
Elmaghrabi "Effect of Nitrogen in Steel" Jan. 30, 2015 (Jan. 30, 2015) p. 1 para[0001]. Retrieved from https://news.steel-360.com/steel/nitrogen-effect-steel/ON Jan. 4, 2018 (Jan. 4, 2018).
Amg Vanadium "Copper" 2009 p. 1 para[0001]-[0002]. Retrieved from https://amg-v.com/copperpage.html on Jan. 4, 2018 (Jan. 4, 2018).
Extended European Search Report (EESR) dated May 19, 2020 issued in related European Patent Application No. 17867378.6.
Written Opinion dated May 23, 2020 issued in related Singapore Patent Application No. 11201903856Y.
1st Office Action dated Aug. 4, 2020 issued in related Chinese Patent Application No. 201780067209.1.
Microstructure and Chemistry Evaluation of Direct Metal Laser Sintered 15-5 PH Stainless Steels, Kevin M. Coffy, p. 8-47, in 2014.

* cited by examiner

3D PRINTABLE HARD FERROUS METALLIC ALLOYS FOR POWDER BED FUSION

CROSS-REFERENCE TO RELATED APPLICATIONS

This application claims the benefit of U.S. Provisional Patent Application Ser. No. 62/415,667, filed on Nov. 1, 2016, which is fully incorporated herein by reference.

FIELD

The present disclosure relates to alloy compositions and 3D printing procedures to provide for the formation of metallic parts with relatively high hardness, tensile strengths, yield strengths, and elongation. The alloys also indicate the ability to form desirable phases, such as metal carbide and/or metal carbonitride phases, that contribute to such mechanical property characteristics.

BACKGROUND

Metal 3D printing processes provide a multitude of exceptional benefits such as the ability to produce highly complex parts with largely reduced part production time. For these reasons 3D printing is of high value to many industries. While many 3D printing processes for building metal parts exist, the most widely adopted processes are those that utilize solid-liquid-solid phase transformations to build parts. These processes are commonly referred to as powder bed fusion (PBF), selective laser melting (SLM), and electron beam melting (EBM), hereinafter these processes are referred to as PBF.

While PBF is exceptionally versatile in its ability to produce complex parts from specific metal alloys, the process has been limited to being able to produce parts from relatively few alloy steels such as 316L, 17-4PH and maraging steel M300. Among these alloys, only M300 has a hardness that is considered sufficient to classify the alloy as a hard alloy (HV>370).

Expanding the material breadth of hard PBF steel alloys has met a variety of issues foremost among which is the occurrence of crack formation upon or after the printing process. Cracking of parts can be caused by a number of factors such as thermal stresses, hot cracking, and liquation cracking, and generally the potential for cracking increases as the hardness of the built parts increases and the toughness decreases.

Numerous industries have a great deal of interest in utilizing PBF with higher hardness materials (HV>370) for applications such as tooling, dies, molds, cutting tools, gears, filters, and bearings. In addition to high hardness these applications typically also require high strength, toughness, and corrosion resistance, low environmental health, low safety and stewardship risk, and low cost.

SUMMARY

A method of layer-by-layer construction of a metallic part comprising supplying an iron-based alloy in particle form including the elements Cr and Mo wherein Cr is present at 10.0 wt. % to 19.0 wt. %, Mo is present at 0.5 wt. % to 3.0 wt. % and at least three elements from C, Ni, Cu, Nb, Si and N, wherein C is present at 0 to 0.35 wt. %, Ni is present at 0 to 4.0 wt. %, Cu is present at 0 to 5.0 wt. %, Nb is present at 0 to 1.0 wt. %, Si is present at 0 to 1.0 wt. % and N is present at 0 to 0.25 wt. %;

the balance of said alloy composition containing Fe; and forming one or more layers of the alloy by melting the alloy into a molten state and cooling and forming a solidified layer of the elements wherein each of the solid layers has a thickness as formed of 2.0 microns to 200.0 microns. The metallic part comprising one or more layers has the following properties: tensile strength of at least 1000 MPa, yield strength of at least 640 MPa, elongation of at least 3.0%, hardness (HV) of at least 375.

The present invention also relates to a 3D printed metallic part comprising one or more iron based metallic alloy layers including the elements Cr and Mo wherein Cr is present at 10.0 wt. % to 19.0 wt. %, Mo is present at 0.5 wt. % to 3.0 wt. % and at least three elements from C, Ni, Cu, Nb, Si and N, wherein C is present at 0 to 0.35 wt. %, Ni is present at 0 to 5.0 wt. %, Cu is present at 0 to 5.0 wt. %, Nb is present at 0 to 1.0 wt. %, Si is present at 0 to 1.0 wt. % and N is present at 0 to 0.25 wt. % and the balance of said alloy composition contains Fe;

said layers having thickness in the range of 2.0 microns to 200.0 microns; and said printed metallic part indicates a tensile strength of at least 1000 MPa, yield strength of at least 640 MPa, elongation of at least 3.0%, and hardness (HV) of at least 375.

DETAILED DESCRIPTION

Figure 1:
FIG. 1 is an optical image of alloy 1 (A10) built on a SLM 280 HL machine.

A new class of steel alloys have been developed that combine excellent printability with, in both the "as built" and in the "heat treated" state, high hardness (>375 HV), high yield and tensile strength, and high elongation as well as low safety (EH&S) and stewardship risk and relatively low cost.

Printability of an alloy is defined as the ease of printing a metal alloy on a variety of commercial PBF machines without cracking or excessive porosity in the built parts. The as-built condition is understood herein as the condition of the PBF built parts upon removal from the PBF machine, i.e. without any post-build heat treatment. The heat treated condition is understood herein as the condition of the PBF built parts that have been subjected to a post-build heat treatment. The alloys herein are capable of 3D printing which refers to a process to create a three-dimensional object.

Table 1 below sets out the alloy chemistries that are preferably employed herein, which includes alloy 1 (A10) and then 10 additional alloys for a total of 11 alloys:

TABLE 1

Alloy Chemistries (Wt. %)

| Alloy | Fe | C | Cr | Ni | Cu | Nb | Mo | Si | N |
|---|---|---|---|---|---|---|---|---|---|
| 1 (A10) | 84.93 | 0.16 | 10.64 | 1.96 | 0.54 | 0.03 | 1.48 | 0.19 | 0.07 |
| 2 | 84.92 | 0.25 | 11.5 | 1 | 0.5 | 0.03 | 1.5 | 0.25 | 0.05 |
| 3 | 84.97 | 0.2 | 11.5 | 1 | 0.5 | 0.03 | 1.5 | 0.25 | 0.05 |
| 4 | 84.96 | 0.16 | 11.5 | 1.05 | 0.59 | 0.04 | 1.51 | 0.18 | 0 |
| 5 | 84.57 | 0.21 | 11.21 | 1.93 | 0.12 | 0.03 | 1.7 | 0.19 | 0.04 |
| 6 | 81.66 | 0.21 | 15.55 | 0.88 | 0.55 | 0.03 | 0.89 | 0.16 | 0.07 |
| 7 | 82.82 | 0.21 | 11.69 | 0.94 | 2.56 | 0.06 | 1.47 | 0.17 | 0.08 |
| 8 | 86.85 | 0.1 | 10.56 | 0 | 0.56 | 0.04 | 1.61 | 0.14 | 0.14 |
| 9 | 85.37 | 0.17 | 11.01 | 1.85 | 0 | 0.04 | 0.95 | 0.53 | 0.074 |
| 10 | 86.64 | 0.12 | 10.55 | 0 | 0.55 | 0.08 | 1.52 | 0.39 | 0.14 |
| 11 | 87.03 | 0.11 | 11.03 | 0 | 0 | 0.08 | 1.38 | 0.2 | 0.16 |

Accordingly, it can be appreciated from the above that one supplies a metal alloy in particle form comprising, consisting essentially of, or consisting of Fe, Cr and Mo, wherein Cr is present at 10.0 wt. % to 19.0 wt. %, Mo is present at 0.5 wt. % to 3.0 wt. % and at least three or more elements from C, Ni, Cu, Nb, Si and N, wherein C is present at 0 to 0.35 wt. %, Ni is present at 0 to 5.0 wt. %, Cu is present at 0 to 5.0 wt. %, Nb is present at 0 to 1.0 wt. %, Si is present at 0 to 1.0 wt. % and N is present at 0 to 0.25 wt. %. The balance of said alloy composition contains Fe. Accordingly, one may select four elements, five elements or all six elements from C, Ni, Cu, Nb, Si and N for a given alloy formulation.

In a preferred embodiment, one again supplies a metal alloy in particle form comprising, consisting essentially of, or consisting of Fe, Cr and Mo, wherein Cr is present at 10.0 wt. % to 18.3 wt. %, Mo is present at 0.5 wt. % to 2.5 wt. % and at least three or more elements from C, Ni, Cu, Nb, Si and N, wherein C is present at 0 to 0.30 wt. %, Ni is present at 0 to 4.0 wt. %, Cu is present at 0 to 4.0 wt. %, Nb is present at 0 to 0.7 wt. %, Si is present at 0 to 0.7 wt. % and N is present at 0 to 0.25 wt. %. The balance of said alloy composition contains Fe.

Furthermore, the alloy may include some amount of inevitable impurities wherein the level of such impurities may be up to 1.0 wt. %, For example, an element not listed above may also be present at a level of up to 1.0 wt. %, where the corresponding level of Fe can then be reduced 1.0 wt. %. With regards to impurities, it is noted that such is contemplated to include elements such as sulfur, phosphorous and oxygen.

Alloy 1, which was previously designated as alloy A10, may itself have the following preferred composition: Fe at 82.0 to 86.0 wt. %; Cr at 10.5 to 12.0 wt. %; Ni at 1.5 to 2.5 wt. %; Cu at 0.4 to 0.7 wt. %; Mo at 1.2 to 1.8 wt. %, C at 0.14 to 0.18 wt. %, Nb at 0.02 to 0.05 wt. %, N at 0.04 to 0.07 wt. % and Si at 0-1.0 wt. %.

The metal alloy is supplied to the PBF process in powder particle or wire form and is preferably produced using conventional melting with either gas, centrifugal, atomization utilizing gases such as nitrogen or argon gas, or water atomization. Nitrogen gas melting and atomization can be used to increase the nitrogen content in the powder alloy. The powder particles can have a diameter in the range of 1 to 200 microns, more preferably from 3 to 70 microns, and most preferably from 15 to 53 microns.

PBF parts are preferably built from the metal alloy herein using commercially available conventional PBF machines such as the SLM®280HL or EOS M-280 and a Trumpf TRUMAFORM LF 250. The parts are preferably built in a nitrogen or argon atmosphere. Parts may be built on a metal substrate that is preheated up to 300° C., such as in the range of 100° C. to 300° C., and more preferably in the range of 20° C. to 200° C. In addition, no preheating of the substrate can be employed. For the PBF procedure herein one may utilize one or a plurality of lasers or electron beams with an energy density of 30 to 500 J/m$^3$, more preferably in the range of 50 J/mm$^3$ to 300 J/m$^3$ and most preferably in the range of 60 J/mm$^3$ to 200 J/mm$^3$.

The metal substrate is preferably composed of the alloys 1-11 in Table 1 or from other materials e.g. from type 304L stainless steel. The PBF procedure herein contemplates a build-up of individual layers each having a thickness typically in the range of 2.0 microns to 200.0 microns, more preferably 5.0 microns to 150.0 microns, and most preferably 5.0 microns to 120.0 microns. Accordingly, a suitable range of thickness for the built-up layers is 2.0 microns and higher. More commonly, however, the thickness range for the built up layers (combination of individual layers) is from 2 microns to 800 mm and even higher depending upon the capability or requirements of a given printing procedure.

Figure 2:
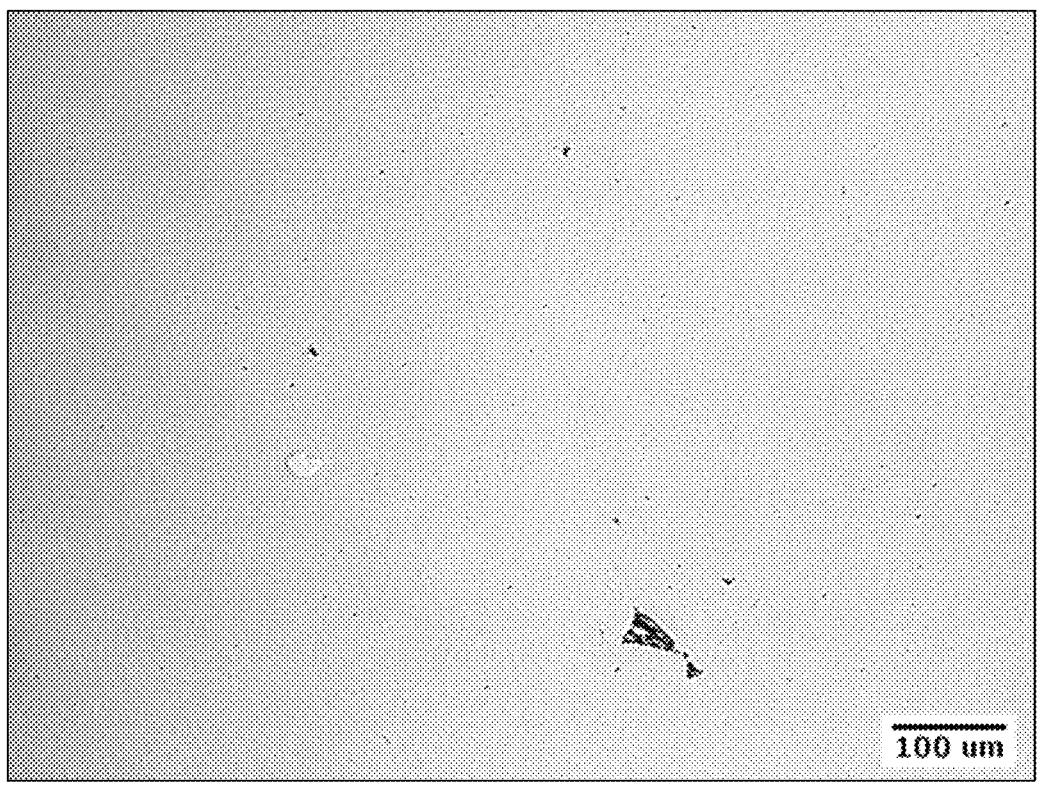
FIG. 2 is an optical image of alloy 1 (A10) built on a Trumpf TRUMAFORM LF 250 PBF machine.
Figure 3:
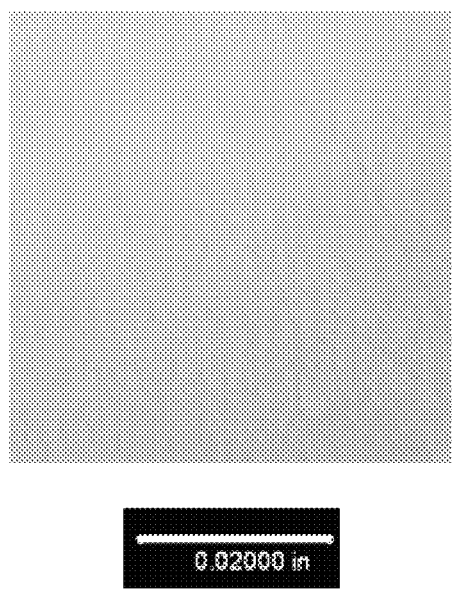
FIG. 3 is an optical image of alloy 1 (A10) built on an EOS machine with a density>99.5%.

Porosity and cracking in parts can negatively affect a number of part properties including strength, toughness, and fatigue resistance. As such, it is desired for dense parts to minimize porosity and cracking in PBF parts. Porosity in parts is preferably less than 1.0%, more preferably less than 0.5%, and most preferably less than 0.2% although some large parts can tolerate higher porosity levels, such as a porosity of greater than 1.0% to 15.0%. Low porosity and no cracking in the as-built PBF parts with the metal alloys herein is evidenced in the cross-sectional optical micrograph images shown in FIGS. 1-3 which were taken from parts built with alloy 1 (A10) on SLM 280HL and Trumpf TRUMAFORM LF 250 PBF machines, and an EOS M280/ 290, respectively. The parts shown in FIGS. 1-3 were built on a substrate with no preheating to a height of 10 mm, using 0.040 mm thick layers, for a total of 250 layers in the parts. Porosity is measured with optical image analysis at 100× magnification and alloy 1 show porosity of less than 0.2%.

PBF parts are preferably heat treated after the parts are built to be able to achieve relatively high hardness, strength, and ductility. Achieving high hardness in-situ with building parts without cracking is relatively difficult due to the thermal stresses and thermal fatigue in the parts as they are built, combined with the typically low toughness and ductility of high hardness alloys. PBF uses an energy source to create a small, quickly traversing, molten metal weld pool to selectively melt the powder in a powder layer, which then re-solidifies adding the next layer in the part. The heat of the traversing weld pool is largely conducted into the part, which results in raising the overall part temperature and providing relatively large temperature gradients in the local vicinity of the weld pool. Large continuous and cyclic thermal stresses can arise in parts during PBF part building due to the thermal gradients and phase transformations in the parts. Parts therefore preferably have sufficient strength, toughness, and ductility to resist crack formation under the localized stress conditions and resist crack propagation under the continuous and cyclic stresses.

"As-Built" alloy properties: Table 2 shows comparative mechanical properties of PBF parts produced with commercial PBF steel alloys and alloy 1 (A10) from Table 1 in the as-built condition (without a post-heat treatment). Properties of alloy 1 (A10) were measured on parts that were PBF built on a substrate with no preheating to a height of 10 mm, using 0.040 mm thick layers, for a total of 250 layers in the parts. Table 2 shows the increased hardness and strength of the metal alloy herein over the commercially applied crack-free steel alloys.

TABLE 2

| Alloy | Tensile Strength [MPa] | Yield Strength [MPa] | Elongation [%] | Hardness [HV] |
|---|---|---|---|---|
| 316L | 640 | 530 | 40 | 171 |
| 17-4PH | 930 | 586 | 25 | 230 |
| M300 | 1100 | 1050 | 10 | 332 |
| Alloy 1 (A10) | 1504 | 1254 | 17 | 454 |

With respect to the hardness data in Table 2, it is worth noting that the reported hardness is such that it is observed to be a function of the alloy composition as well as the printing procedure employed. Accordingly, in the case of, e.g. M300, the printing hardness may vary, depending upon the printing procedure, such that the HV hardness may be in the range of 320 to 370.

Table 3 below now provides the mechanical properties for all the alloys identified in Table 1 in the "AB" or as-built condition, without a heat treatment and in condition "B1" which is reference to a heat treatment, which heat treatment is discussed further herein:

TABLE 3

| Alloy | Test Condition | Hard. (HV) | YS (MPa) | UTS (MPa) | Elong. (%) |
|---|---|---|---|---|---|
| 1 | AB | 454 | 1254 | 1504 | 17 |
| (A10) | B1 | 502 | 1325 | 1659 | 16 |
| 4 | AB | 450 | 1048 | 1082 | 3 |
|   | B1 | 491 | 995 | 1011 | 1 |
| 5 | AB | 531 | 1207 | 1659 | 19 |
|   | B1 | 556 | 1338 | 1785 | 10 |
| 6 | AB | 381 | 649 | 1422 | 19 |
|   | B1 | 519 | 1329 | 1631 | 12 |
| 7 | AB | 415 | 1003 | 1538 | 20 |
|   | B1 | 574 | 1571 | 1880 | 6 |
| 8 | AB | 455 | 1041 | 1274 | 8 |
|   | B1 | 561 | 1345 | 1629 | 13 |
| 9 | AB | 474 | 1274 | 1552 | 15 |
|   | B1 | 531 | 1337 | 1676 | 14 |
| 10 | AB | 438 | 979 | 1191 | 7 |
|   | B1 | 564 | 1368 | 1637 | 10 |
| 11 | AB | 501 | 1090 | 1365 | 7 |
|   | B1 | 563 | 1438 | 1621 | 5 |

As may therefore be appreciated from the above, the alloys herein, in the as-built condition (no heat treatment) are such that they indicate a tensile strength of at least 1000 MPa, more preferably at least 1100 MPa, or at least 1200 MPa, and even more preferably, at least 1300 MPa. Moreover, it can now be appreciated that the tensile strength of the as built alloys herein falls in the range of 1000 MPa to 1900 MPa, or 1100 MPa to 1900 MPa, or 1200 MPa to 1900 MPa or 1300 MPa to 1900 MPa.

The above tensile strength is achieved in combination with a yield strength of at least 640 MPa, or at least 700 MPa, or at least 800 MPa, or at least 900 MPa, or at least 1000 MPa, or at least 1100 MPa, or at least 1200 MPa, or at least 1300 MPa, or at least 1400 MPa or at least 1500 MPa.

Moreover, it can now be appreciated that the yield strength of the as built alloys herein falls in the range of 640 MPa to 1500 MPa.

Moreover, the above tensile strength and yield strength is also preferably achieved in combination with an elongation of at least 3%, 4%, 5%, 6%, 7%, 8%, 9%, 10%, 11%, etc. up to 25%. Moreover, it can be appreciated that the elongation of the as built alloys herein fall in the range of 3% to 25%.

The above tensile strength, yield strength and elongation is then preferably achieved in combination with a hardness (HV) value of at least 375, 400, 410, 420, 430, 440, etc. up to 600. Moreover, it can be appreciated that the HV values of the alloys herein fall in the range of 375 to 600.

Accordingly, it should be appreciated that the alloys herein are such that they can provide in the as built condition a tensile strength of at least 1000 MPa, a yield strength of at least 640 MPa, and elongation of at least 3% and a hardness (HV) value of at least 375. Other combinations of tensile strength, yield strength, elongation and hardness may now be selected from the individual preferred levels of tensile strength, yield strength, elongation and hardness noted herein for the non-heat treated alloy.

Figure 4:
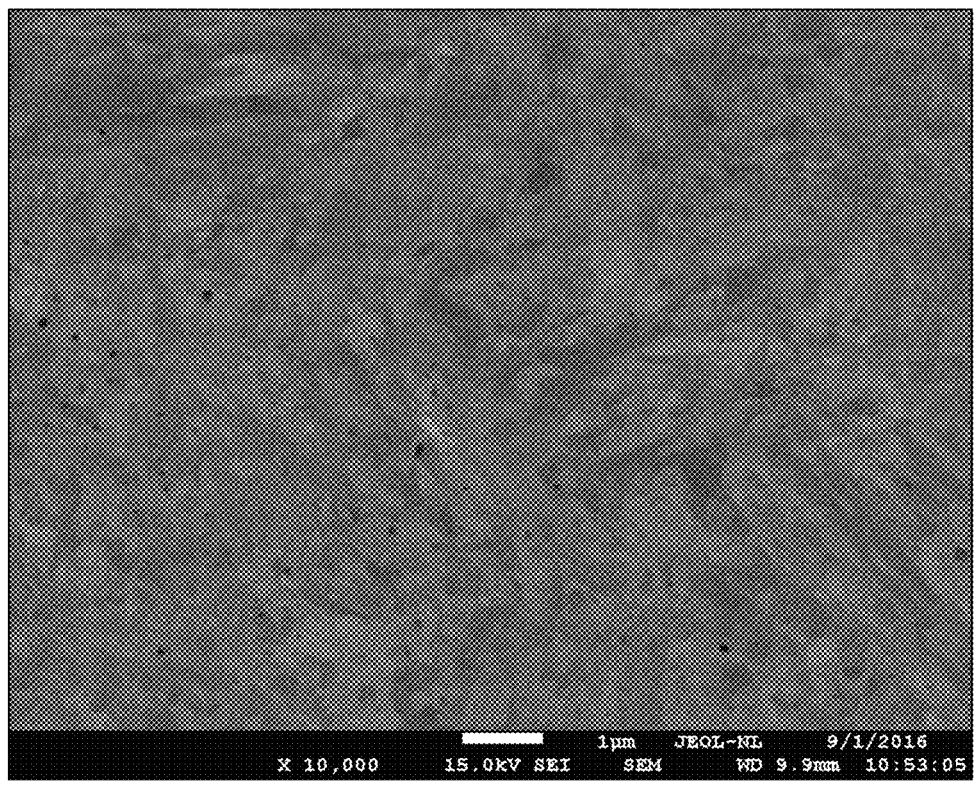
FIG. 4 shows a 10,000×SEM micrograph of as-built alloy 1 (A10).

FIG. 4 shows a 10,000×, secondary electron, scanning electron microscopy (SEM) micrograph of a PBF-produced, as-built, alloy 1 (A10) part. The part shown in FIG. 4 was built on a substrate with no preheating to a height of 10 mm, using 0.040 mm thick layers, for a total of 250 layers in the parts. SEM imaging was performed on a Jeol JSM-7001F Field Emission SEM. The microstructure in FIG. 4 is contemplated to contain the BCC/martensite, FCC, $M_2CN$, and $M_7C_3$.

Figure 5:
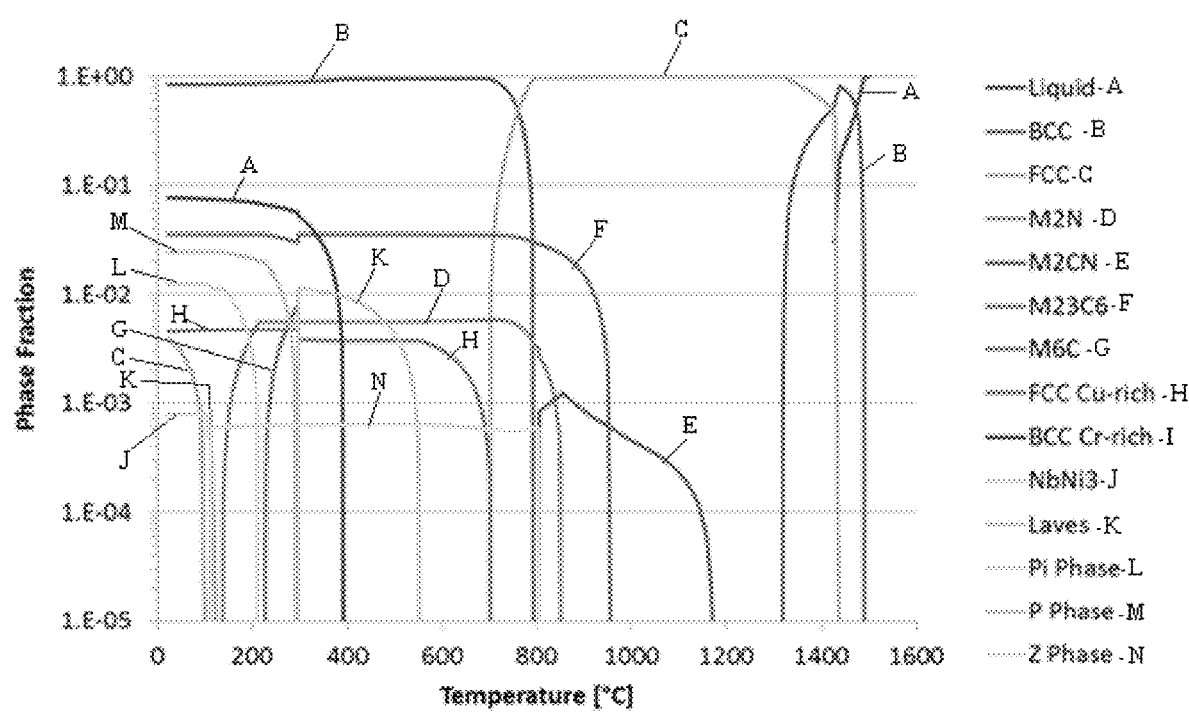
FIG. 5 shows the alloy 1 equilibrium phase diagram produced with Thermo-Calc.

FIG. 5 shows the alloy 1 (A10) equilibrium phase diagram produced with Thermo-Calc showing the phase fraction of each phase that is thermodynamically stable over a temperature range from 20° C. to 1500° C. The equilibrium phase diagram was used to identify the phases with the highest potential to contribute to increasing hardness and strength.

It is contemplated that the elevated temperature of PBF parts during building, which is caused by heat transfer to the part from the traversing weld pool, may be sufficiently high in the metal alloys herein to drive in-situ precipitation of secondary phases such as the Cu-rich FCC phase, the $M_2N$ $((Cr,Mo)_2N)$ phase, and the $M_{23}C_6$ $((Cr,Fe,Mo)_{23}C_6)$ phase shown in the FIG. 5 phase diagram for alloy 1 (A10). The in-situ precipitation of these phases during the part build is expected to contribute to the part strength and hardness in the as-built condition.

"Heat Treatment": PBF parts produced with the metal alloys herein can be further enhanced by heat treating to increase the strength and hardness of the parts. It is contemplated that various heat treatments can be performed to affect the part properties and the heat treatment temperatures can be selected from equilibrium phase diagrams.

Effective heat treatments for the metal alloys herein are contemplated to include (1) high temperature solutionizing (dissolving one or more of the secondary phases), quenching, and tempering (precipitation of the secondary phases) and/or (2) tempering of the as-built part, with each heat treating step being performed in a vacuum, argon, or nitrogen atmosphere. Solutionizing is preferably performed at a temperature of greater than 900° C., and for example in the range of 900° C. to 1400° C. and tempering is preferably performed at a temperature in the range of 150–900° C.

(1) The high temperature solutionizing and quenching step is contemplated to:

a. reduce anisotropy in the part that can result from the PBF process,
b. increase martensite content and thereby hardness and possibly strength
c. dissolve Cr carbides and/or Cr nitrides that can negatively affect the corrosion resistance of the part,
d. coarsen the undissolved carbides and/or nitrides.

(2) Further strengthening and hardening of the part via additional precipitation of various phases is contemplated to be initiated by subsequent tempering treatments.

"Heat Treatment"—procedure: The equilibrium phase diagram in FIG. 5 was used to select solutionizing and tempering temperatures for PBF parts from alloy 1 (A10). The heat treatment used on the alloy 1 (A10) PBF parts consisted of solutionizing at 1000° C. for 1.5 hr followed by a gas quench to −84° C. for 2 hours, and finally tempering at 454° C. for 48 hr in Argon to strengthen and harden the part.

"Heat Treated"—alloy properties: Properties of the heat treated PBF alloy 1 (A10) parts are shown in Table 4 along with commercial PBF steel alloys after subjecting them to their manufacturer-prescribed heat treatments for PBF parts. Properties of heat treated alloys 1, 4, 5, 6, 7, 9, 0, 10 and 11 were also listed in Table 3. Properties of alloy 1 (A10) were measured on heat treated parts that were PBF built on a substrate with no preheating to a height of 10 mm, using 0.040 mm thick layers, for a total of 250 layers in the parts. The hardness of alloy 1 (A10) shown in Table 4 was taken at the surface of the heat treated part.

TABLE 4

| Alloy | Tensile Strength [MPa] | Yield Strength [MPa] | Elongation [%] | Hardness [HV] |
| --- | --- | --- | --- | --- |
| 316L | 843 | 587 | 28 | 262 |
| 17-4PH | 1100 | 590 | 29 | 311 |
| M300 | 2050 | 1990 | 2 | 544 |
| Alloy 1 (A10) | 1659 | 1325 | 16 | 502 |

As may therefore be appreciated from Tables 3 and 4, the alloys herein following heat treatment are such that they indicate a tensile strength of at least 1000 MPa, or at least 1100 MPa, or at least 1200 MPa, or at least 1300 MPa, or at least 1400 MPa, or at least 1500 MPa, or at least 1600 MPa, or at least 1700 MPa, or at least 1800 MPa. Moreover, it can be appreciated that the heat-treated alloys have a tensile strength in the range of 1000 MPa to 1900 MPa.

Such tensile strength is achieved in combination with a yield strength of at least 900 MPa, or at least or at least 1000 MPa, or at least 1100 MPa, or at least 1200 MPa, or at least 1300 MPa, or at least 1400 MPa, or at least 1500 MPa, or at least 1600 MPa. Moreover, it can be appreciated that the heat-treated alloys herein have a yield strength in the range of 900 MPa to 1600 MPa.

Such tensile strength and yield strength is also preferably achieved in combination with an elongation of at least 1%, 2%, 3%, 4%, 5%, 6%, 7%, 8%, 9%, 10%, etc. up to 16%. Moreover, it can be appreciated that the heat-treated alloys herein have elongation values in the range of 1% to 16%.

Such tensile strength, yield strength and elongation is then preferably achieved in combination with a hardness (HV) value of at least at least 475, or at least 500, or at least 525, or at least 550, or at least 600. Moreover, it can be appreciated that the heat-treated alloys herein have HV values in the range of 475 to 650.

Accordingly, it should be appreciated that the alloys herein with heat treatment are such that they can provide, e.g., a tensile strength of at least 1000 MPa, a yield strength of at least 900 MPa, and elongation of at least 1% and a hardness (HV) value of at least 475. Other combinations of tensile strength, yield strength, elongation and hardness may now be selected from the individual preferred levels of tensile strength, yield strength, elongation and hardness noted herein for the heat treated alloy.

Table 4 shows that heat treatment does not raise the hardness of 316L and 17-4PH to a level that either alloy could be classified as a hard alloy (HV>370). Only the hardness value of M-300 after heat treatment classifies the alloy as a hard alloy (HV>370) and M300 is currently the primary alloy choice in additive manufacturing when a hard alloy is required. However, the application space of M-300 is highly limited since M300 features at such hardness levels indicate only a low elongation (2%), indicating a tendency for parts to fracture or undergo chipping when exposed to even small impact force such as dropping the part to the floor. Therefore, the application of M300 finds relatively limited industrial use. Additionally, the M300 alloy contains a significant concentration of relatively high cost elements (18 wt % Ni, 9 wt % Co, and 5 wt % Mo) and as such would not be considered a low-cost alloy further limiting its industrial use. Finally, the industrial use of M-300 is further limited due to its potential EH&S and product stewardship risks given its high cobalt content. Cobalt is known to be a health risk upon inhalation and a stewardship risk due to its classification as a conflict mineral since it is mainly sourced from the Republic of Congo.

In contrast, the heat-treated alloy 1 (A10) has numerous benefits compared to the current incumbent M300. Alloy 1 (A10) has a higher hardness, a higher elongation, a lower cost structure, and is preferably cobalt free.

Case Hardening Treatment—

The surface hardness of PBF parts produced with the metal alloys herein can be further enhanced by carburizing and nitriding case hardening treatments. These treatments introduce carbon and nitrogen, respectively, to the surface of the part, creating a case layer with increased hardness relative to the "as-built" or "heat-treated" conditions while retaining the heat treated properties in the core. It is contemplates that other treatments employed for case hardening such as carbonitriding can also be used.

Carburizing—

The carburizing process for the metal alloys herein preferably includes a combination of the following steps: oxide reduction, carburizing, solutionizing, quenching, and tempering. Oxide reduction is performed in a reducing atmosphere at temperatures preferably between 800° C. and 1200° C., more preferably between 900° C. and 1150° C., and most preferably between 950° C. and 1100° C. Carburizing is performed by a method that provides or generates a source of carbon in the atmosphere or environment surrounding the part, such as pack, gas, vacuum, liquid, and plasma carburizing, at temperatures preferably between 800° C. and 1000° C., more preferably between 850° C. and 975° C., and most preferably between 875° C. and 950° C.

Figure 6:
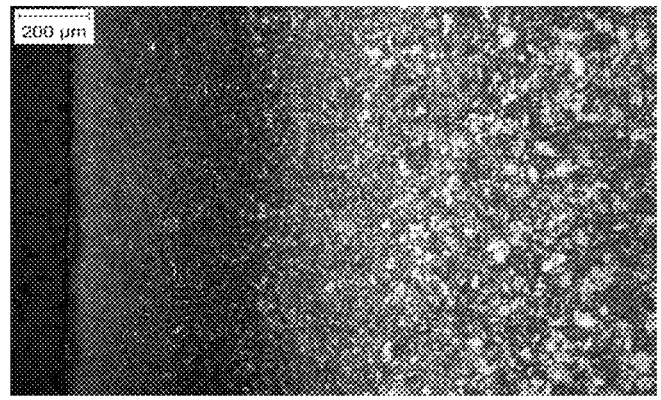
FIG. 6 shows microstructures at the surface of a part made of alloy 5 (Table 1) at two different magnifications after carburization.
Figure 6:
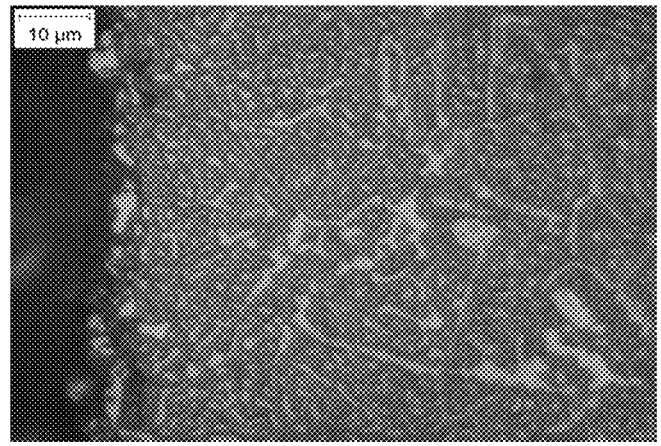
Figure 7:
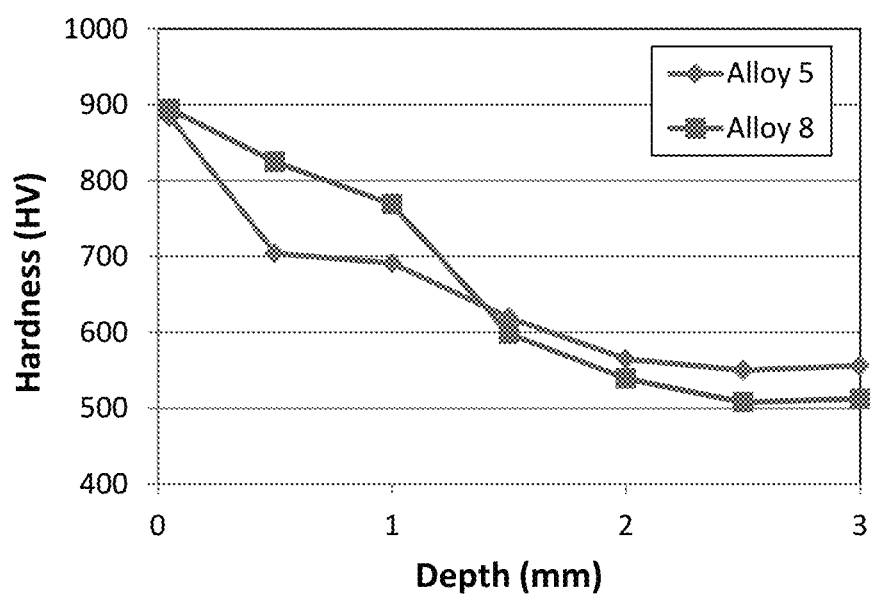
FIG. 7 shows hardness as a function of depth in a carburized case hardened alloy 5 and alloy 8 (Table 1).

The carburization results in an enrichment of carbon at the surface of the part resulting in a layer of material with a different microstructure compared to that of the core as seen at two different magnifications in FIG. 6 for alloy 5. This structure results in a maximum hardness at the exterior surface that is preferably 650 to 1000 HV, more preferably 700 to 975 HV, and most preferably 800 to 950 HV. The hardness then progressively decreases with increasing distance from the exterior surface (i.e. depth into the part) until it reaches a steady-state value in the core similar to heat treated values discussed herein. Representative examples of the hardness as a function of depth in carburized case hardened alloys 5 and 8 are seen in FIG. 7. Other alloys listed herein can similarly be case hardening by a carburizing process with similar effectiveness. The level of carbon can be increased at the surface down to a depth of at least 2.0 mm, and up to 4.0 mm.

Nitriding—

Figure 8:
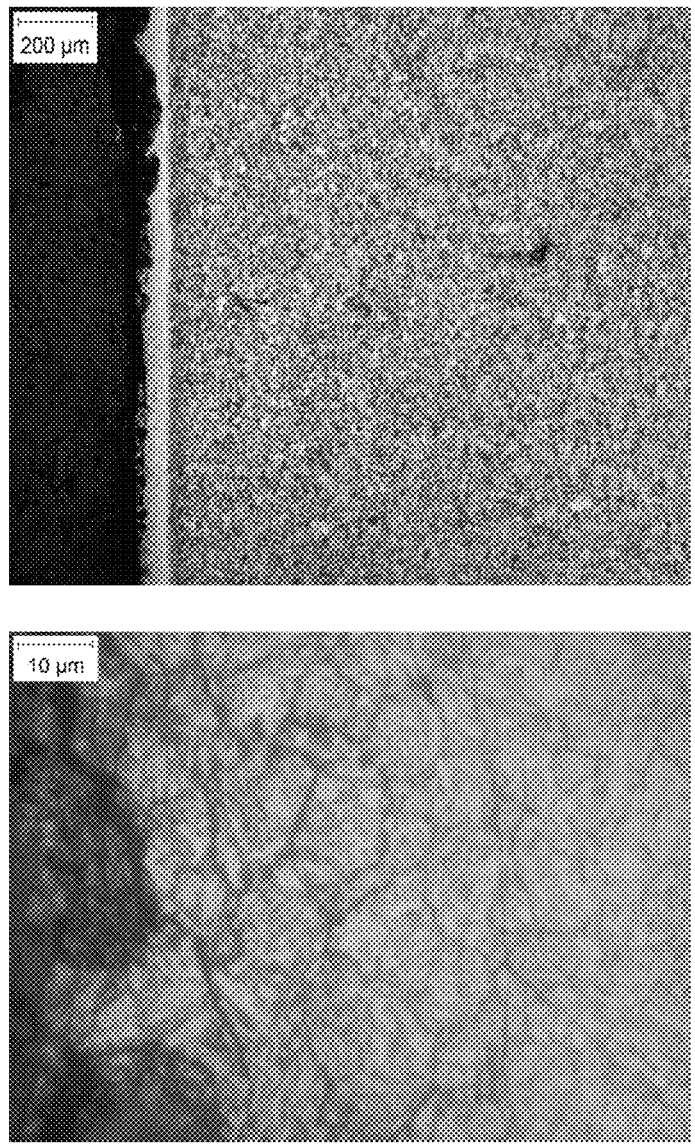
FIG. 8 shows microstructures at the surface of a part of alloy 9 (Table 1) at two different magnifications after nitriding.
Figure 9:
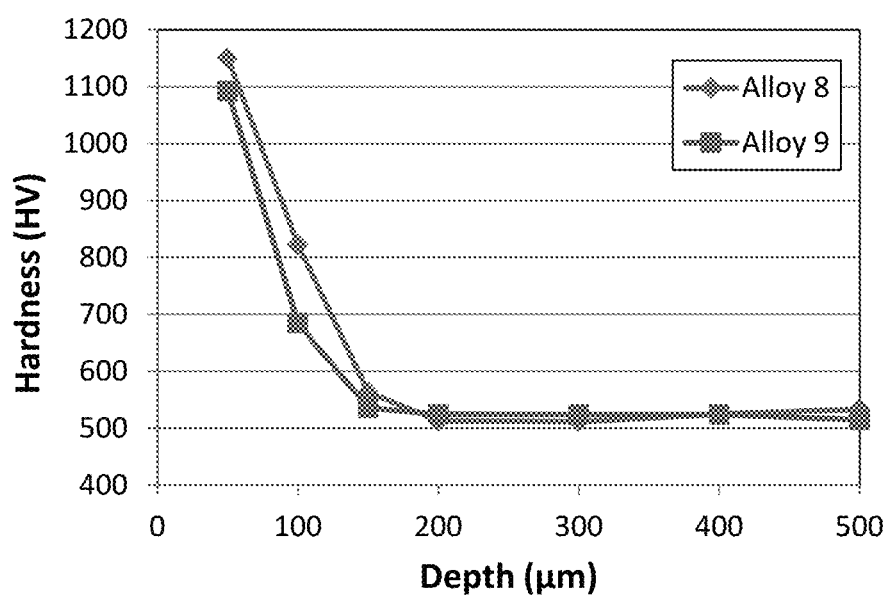
FIG. 9 shows hardness as a function of depth in a nitrided case hardened alloy 8 and 9 (Table 1).

The nitriding process for the metal alloys herein includes a combination of the following steps: solutionizing, quenching, and tempering. It is contemplated that the nitrogen may be introduced to the surface of the part by other nitriding methods, including plasma and liquid nitriding processes. The enrichment of nitrogen at the surface of the part results in a layer of material with a different microstructure compared to that of the core as seen at two different magnifications for alloy 9 (Table 1) are illustrated in FIG. 8. This structure results in a maximum hardness at the exterior surface that is preferably 700 to 1300 HV, more preferably 750 to 1250 HV, and most preferably 825 to 1225 HV. The hardness then progressively decreases with increasing distance from the exterior surface (i.e. depth into the part) until it reaches a steady-state value in the core similar to heat treated values discussed herein. Representative examples of the hardness as a function of depth in nitrided case hardened alloys 8 and 9 are seen in FIG. 9. As can be seen, the level of nitrogen is increased from the surface down to a depth of at least 200 am and up to 400 am. Other alloys listed herein can similarly be case hardened by a nitriding process with similar effectiveness.

What is claimed is:

1. A method of layer-by-layer construction of a metallic part comprising:
    supplying particles of an iron-based alloy, the iron-based alloy comprising:
        Cr in an amount ranging from 10.0 wt. % to 19.0 wt. %;
        Mo in an amount ranging from 0.5 wt. % to 3.0 wt. %;
        at least three elements from C, Ni, Cu, Nb, Si and N; and
        the balance of said iron-based alloy containing Fe; and
    forming an as-built metallic part at least in part by powder bed fusing comprising melting the particle into a molten state and cooling and forming one or more solidified layers of the iron- based alloy;
    wherein:
        when C is in the iron-based alloy, it is present in an amount of 0.35 wt. % or less;
        when Ni is in the iron-based alloy, it is present in an amount of 5.0 wt. % or less;
        when Cu is in the iron-based alloy, it is present in an amount of 5.0 wt. % or less;
        when Nb is in the iron-based alloy, it is present in an amount of 1.0 wt. % or less;
        when Si is in the iron-based alloy, it is present in an amount of 1.0 wt. % or less; and
        when N is in the iron-based alloy, it is present in an amount of 0.25 wt. % or less;
    each of the one or more solidified layers has an as-formed thickness of 2.0 microns to 200.0 microns; and
    said as-built metallic part has a tensile strength of at least 1000 MPa, a yield strength of at least 640 MPa, an elongation of at least 3.0%, and a hardness (HV) of at least 375; and
    further comprising heating the as-built metallic part at a temperature of greater than 900 ° C. followed by a gas quench and cooling to form a solutionized metallic part with an increase in martensite content.

2. The method of claim 1, further comprising tempering the solutionized metallic part at a temperature at or above 150 ° C. to form a tempered martensite metallic part.

3. The method of claim 2, wherein said tempered metallic part has a tensile strength of at least 1000 MPa, a yield strength of at least 900 MPa, an elongation of at least 1.0% and a hardness (HV) of at least 475.

4. The method of claim 2, wherein the tempered metallic part has a surface, and the method further comprises carburizing the tempered metallic part to increase a level of carbon from the surface down to a depth of 4.0 mm.

5. The method of claim 2, wherein the tempered metallic part has a surface, and the method further comprises nitriding the as-built metallic part to increase a level of nitrogen from the surface down to a depth of 400 p.m.

6. The method of claim 1, wherein the iron-based alloy includes at least four elements selected from C, Ni, Cu, Nb, Si and N.

7. The method of claim 1, wherein said iron-based alloy includes at least five elements selected from C, Ni, Cu, Nb, Si and N.

8. The method of claim 1, wherein said iron-based alloy includes C, Ni, Cu, Nb, Si and N.

9. The method of claim 1, wherein said iron-based alloy comprises at least 0.14 wt. % Si.

10. The method of claim 1, wherein said iron-based alloy comprises at least 0.1 wt. % C.

11. The method of claim 1, wherein said iron-based alloy comprises at least 0.88 wt. % Ni.

12. The method of claim 1, wherein said iron-based alloy comprises at least 0.12 wt. % Cu.

13. The method of claim 1, wherein said iron-based alloy comprises at least 0.03 wt. % Nb.

14. The method of claim 1, wherein said iron-based alloy comprises at least 0.074 weight % N.

15. The method of claim 1, wherein said iron-based alloy comprises:
    at least 0.14 wt. % Si;
    at least 0.1 wt. % C; and
    at least 0.04 wt. % Nb.

16. The method of claim 1, wherein said iron-based alloy further comprises up to 1.0 wt. % of inevitable impurities.

17. The method of claim 1, wherein the as-built metallic part is crack free.

18. A method of layer-by-layer construction of a metallic part comprising:
    supplying particles of an iron-based alloy, the iron-based alloy comprising:
        Fe in an amount ranging from 82.0 wt. % to 86.0 wt. %;
        Cr in an amount ranging from 10.5 wt. % to 12.0 wt. %;
        Ni in an amount ranging from 1.5 wt. % to 2.5 wt. %;
        Cu in an amount ranging from 0.4 wt. % to 0.7 wt. %;
        Mo in an amount ranging from 1.2 wt. % to 1.8 wt. %;
        C in an amount ranging from 0.14 wt. % to 0.18 wt. %;
        Nb in an amount ranging from 0.02 wt. % to 0.05 wt. %;
        N in an amount ranging from 0.04 to 0.07 wt. %;
        and when silicon is in the iron-based alloy, it is present in an amount of 1.0 wt.% or less;

forming an as-built metallic part at least in part by powder bed fusing comprising melting the particle into a molten state and cooling and forming one or more solidified layers of the iron-based alloy wherein each of the one or more solidified layers has an as-formed thickness of 2.0 microns to 200.0 microns and said as-built metallic part has a tensile strength of at least 1000 MPa, a yield strength of at least 640 MPa, an elongation of at least 3.0%, and a hardness (HV) of at least 375.

19. The method of claim 18, wherein said iron-based alloy includes C, Ni, Cu, Nb, Si and N.

* * * * *

UNITED STATES PATENT AND TRADEMARK OFFICE
CERTIFICATE OF CORRECTION

| | |
|---|---|
| PATENT NO. | : 10,920,295 B2 |
| APPLICATION NO. | : 15/800210 |
| DATED | : February 16, 2021 |
| INVENTOR(S) | : Tuffile et al. |

It is certified that error appears in the above-identified patent and that said Letters Patent is hereby corrected as shown below:

In the Claims

Column 10, Line 23, Claim 5:
After "from the surface down to a depth of 400"
Delete "p.m."
Insert --"µm."--.

Signed and Sealed this
Thirteenth Day of December, 2022

Katherine Kelly Vidal
*Director of the United States Patent and Trademark Office*